(12) United States Patent
Blair et al.

(10) Patent No.: US 6,787,506 B2
(45) Date of Patent: Sep. 7, 2004

(54) USE OF DISPERSION POLYMERS AS FRICTION REDUCERS IN AQUEOUS FRACTURING FLUIDS

(75) Inventors: Cecil C. Blair, East Bernard, TX (US); Kin-Tai Chang, Sugar Land, TX (US); Duane S. Treybig, Sugar Land, TX (US); Kurt S. Gerken, Richmond, TX (US)

(73) Assignee: Nalco Energy Services, L.P., Sugar Land, TX (US)

( * ) Notice: Subject to any disclaimer, the term of this patent is extended or adjusted under 35 U.S.C. 154(b) by 0 days.

(21) Appl. No.: 10/115,852

(22) Filed: Apr. 3, 2002

(65) Prior Publication Data

US 2003/0191030 A1 Oct. 9, 2003

(51) Int. Cl.$^7$ .............................. E21B 43/26; C09K 3/00
(52) U.S. Cl. ...................... 507/222; 507/225; 507/226; 507/922; 166/308.2; 166/308.3
(58) Field of Search ................................ 507/222, 225, 507/226, 922; 166/308.2, 308.3, 308

(56) References Cited

U.S. PATENT DOCUMENTS

| | | | | |
|---|---|---|---|---|
| 3,254,719 A | * | 6/1966 | Root | 166/308.2 |
| 4,152,274 A | | 5/1979 | Phillips et al. | |
| 4,323,123 A | * | 4/1982 | Swanson | 507/225 |
| 4,725,372 A | * | 2/1988 | Teot et al. | 507/922 |
| 4,752,404 A | * | 6/1988 | Burns et al. | 507/226 |
| 5,756,004 A | * | 5/1998 | Brezinski | 507/922 |
| 5,939,362 A | | 8/1999 | Johnson et al. | |

* cited by examiner

*Primary Examiner*—Philip C. Tucker
(74) *Attorney, Agent, or Firm*—Michael B. Martin; Thomas M. Breininger

(57) ABSTRACT

A method of reducing friction resulting from turbulent flow in an aqueous fracturing fluid in an oil field fracturing process comprising adding to the aqueous fracturing fluid an effective friction-reducing amount of one or more dispersion polymers, wherein the dispersion polymer is composed of from about 5 to about 95 mole percent of one or more nonionic monomers and from about 95 to about 5 mole percent of one or more cationic or anionic monomers and has a molecular weight of at least 100,000.

14 Claims, No Drawings

USE OF DISPERSION POLYMERS AS FRICTION REDUCERS IN AQUEOUS FRACTURING FLUIDS

TECHNICAL FIELD

This invention concerns a method of using water-soluble dispersion polymers to reduce friction resulting from turbulent flow in an aqueous fracturing fluid as it is pumped at high velocity through oil well casings or tubing strings.

BACKGROUND OF THE INVENTION

In a well stimulation operation, a large amount of fracturing fluid is pumped down a well bore hole under high pressure and at high flow rates to a depth of about 500 meters to 6 kilometers or more, causing the rock formation surrounding the well bore to fracture. The pressure is then relieved allowing the oil to seep through the fractures in to the well bore where it is pumped to the surface.

The turbulence produced as the fracturing fluid is pumped through the pipe under pressure results in the production of friction, thereby increasing the amount of energy required to move the amount of fluid at the same speed.

Generally, high molecular weight linear polymers are used to alter the rheological properties of the fluid so that the turbulent flow is minimized, thereby preventing consequent energy loss in the fluid as it is pumped through the pipe. A good friction reducer will cause a large decrease in friction at small concentrations, will be inexpensive, and will have high shear, temperature and pressure stability.

Despite having suitable molecular weights, standard latex emulsion polymers, where polymer solids are dispersed in a hydrocarbon solvent and stabilized with surfactants, are of limited utility due to the environmental unfriendliness of hydrocarbons and surfactants in case of spill or discharge on land or on an off shore platform and the potential fire hazards associated with the hydrocarbon solvent. The latex polymers also must be inverted prior to use, which involves the use of additional surfactants.

Dry polymers are conventionally used in these applications due to the high polymer concentration available in this form as compared to solution polymers. However, dry polymers are difficult to dissolve, requiring special equipment as well as significant energy and water consumption to assure adequate makedown of the dry polymer into an active dilute form. In remote drilling locations equipment, energy and water are often in short supply and require significant financial input to secure.

The use of copolymers of acrylamide with various cationic and anionic monomers for reducing friction loss in well fracturing processes are disclosed in U.S. Pat. No. 3,254,719. Preferred polymer compositions are those wherein 20–40 percent of the amide groups have been hydrolyzed using alkali.

The use of copolymers of acrylamide with quaternary salts of dimethylaminoethyl methacrylamide or dimethylaminopropyl methacrylamide for reducing friction loss in well fracturing processes are disclosed in U.S. Pat. No. 4,152,274.

A method of using dispersion polymers in combination with nitrogen-containing corrosion inhibitors to prevent corrosion in a pipeline in contact with crude oil emulsions being transported under turbulent flow conditions is disclosed in U.S. Pat. No. 5,939,362.

Neither of U.S. Pat. Nos. 3,254,719 and 4,154,274 addresses the handling and safety problems associated with the use of dry polymers or polymers containing surfactants and hydrocarbon solvents, while U.S. Pat. No. 5,939,362 does not address the use of polymers in aqueous fracturing fluids. Accordingly, there is an ongoing need to develop friction reducing agents for use in fracturing fluids that solve the handling, safety and environmental issues discussed above.

SUMMARY OF THE INVENTION

This invention is directed to a method of reducing friction resulting from turbulent flow in an aqueous fracturing fluid in an oil field fracturing process comprising adding to the aqueous fracturing fluid an effective friction-reducing amount of one or more water-soluble dispersion polymers, wherein the dispersion polymer is composed of from about 5 to about 95 mole percent of one or more nonionic monomers and from about 95 to about 5 mole percent of one or more cationic or anionic monomers.

The polymers of this invention are aqueous-based dispersions that contain neither organic solvents or surfactants, resulting in an environmentally friendly treatment system that addresses the environmental concerns of petroleum producing industries.

DETAILED DESCRIPTION OF THE INVENTION

Definitions of Terms

"Anionic monomer" means a monomer as defined herein which possesses a negative charge. Representative anionic monomers include (meth)acrylic acid, and it's salts, including, but not limited to acrylic acid, sodium acrylate, ammonium acrylate, methacrylic acid, sodium methacrylate, and ammonium methacrylate; 2-acrylamido-2-methylpropanesulfonic acid (AMPS) and its sodium salt; vinyl sulfonic acid and its salts including sodium vinyl sulfonate; styrene sulfonic acid and its salts; maleic acid and it's salts, including, but not limited to the sodium salt and ammonium salt; sulfopropyl acrylate or methacrylate or other water-soluble forms of these or other polymerisable carboxylic or sulphonic acids; sulfomethylated acrylamide; allyl sulfonate; itaconic acid, acrylamidomethylbutanoic acid; fumaric acid; vinylphosphonic acid; allylphosphonic acid, phosphonomethylated acrylamide, and the like.

"Cationic Monomer" means a monomer as defined herein which possesses a positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride.

"Dispersion polymer" means a water-soluble polymer dispersed in an aqueous continuous phase containing one or more inorganic salts. Representative examples of dispersion polymerization of water-soluble polymers in an aqueous continuous phase can be found in U.S. Pat. Nos. 5,605,970; 5,837,776; 5,985,992; 4,929,655; 5,006,590; 5,597,859; 5,597,858; 6,171,505 and 6,265,477 and in European Patent Nos. 183,466; 657,478; and 630,909 and PCT Application Number US01/10867, incorporated herein by reference.

Dispersion polymers are prepared by combining water, one or more inorganic salts, one or more water-soluble monomers, any polymerization additives such as chelants, pH buffers or chain transfer agents, and a water-soluble stabilizer polymer. In addition, further processing, structure modifying and/or stabilizing agents may be added to the mixture. All or a portion of this mixture is charged to a reactor equipped with a mixer, thermocouple, nitrogen purging tube, and water condenser. The solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. A portion of the reaction mixture containing any combination of the starting materials may be added in a semi-batch fashion during the course of the polymerization to improve processing or affect polymer composition or molecular weight. After this time, the products are cooled to room temperature, and any post-polymerization additives are charged to the reactor. Water continuous dispersions of water-soluble polymers are free flowing liquids with product viscosities of from about 50 to about 10,000 centipoise (cP), as measured at low shear.

Inorganic salts suitable for preparing the dispersion polymer include inorganic or organic sulfates, phosphates, chlorides, fluorides, citrates, acetates, tartrates, hydrogenphosphates or a mixture thereof. Preferred salts include ammonium sulfate, sodium sulfate, magnesium sulfate, aluminum sulfate, ammonium hydrogen phosphate, sodium hydrogen phosphate, potassium hydrogen phosphate, sodium chloride and ammonium chloride. The salts are used in aqueous solution typically having a combined total concentration of 15 weight percent or above in the product mixture.

Additional organic cationic salts which may be used alone or in combination with the above inorganic salts for preparing anionic dispersion polymers. Preferred cationic salts include tetraalkylammonium halides having from 4 to 22 carbon atoms, substituted tetraalkylammonium halides having from 4 to 22 carbon atoms, aryl trialkylammonium halides having from 9 to 22 carbon atoms, and substituted aryl trialkylammonium halides having from 9 to 22 carbon atoms are preferred. Representative preferred cationic salts include cetylpyridinium chloride, cetylmethylammonium chloride and benzyltriethylammonium chloride.

Cationic dispersion polymers may also be prepared using a mixture of the inorganic salts described above with one or more anionic inorganic salts and one or more thiocyanates, perchlorates, chlorates, bromides, iodides or nitrates, including sodium, potassium or ammonium thiocyanate, sodium perchlorate, sodium chlorate, sodium bromide, sodium iodide, sodium nitrate and the like.

Representative organic anionic salts include metal or ammonium salts of trichloroacetate and trifluoromethanesulfonate; sulfonates and disulfonates such as methanesulfonate, ethanesulfonate, propanesulfonate, butanesulfonate, butanedisulfonate, pentanesulfonate, hexanesulfonate, hexanedisulfonate, and octanedisulfonate; aryl and substituted aryl sulfonates and disulfonates such as benzenesulfonate, nitrobenzenesulfonate, xylenesulfonate, toluenesulfonate, benzenedisulfonate, naphthalenesulfonate; dialkylsulfosuccinates such as diisobutylsulfosuccinate, diisooctylsulfosuccinate, dimethylsulfosuccinate, diethylsulfosuccinate, and diisopropylsulfosuccinate; dicycloalkylsulfosuccinates; and diarylsulfosuccinates. Preferred anionic salts include sodium hexanesulfonate, sodium benzenesulfonate, sodium xylenesulfonate sodium benzenedisulfonate, sodium butanedisulfonate, sodium hexanedisulfonate, sodium octanedisulfonate, and sodium decanedisulfonate. The relatively hydrophobic nature of these salts facilitate dispersion formation. Such salts may be added in any order with the other reaction components, and the order of addition can be used to effect changes in polymer processing.

Suitable polymeric stabilizing agents for preparing cationic and nonionic dispersion polymers include water-soluble cationic polymers that are preferably soluble in the aqueous salt solution. The dispersant is used in an amount of from about 1 to about 10% by weight based on the total weight of the dispersion polymer. The polymeric stabilizing agents or stabilizers facilitate discrete particle formation and prevent agglomeration and gel formation.

Suitable cationic stabilizers for preparing cationic and nonionic dispersion polymers include but are not limited to epichlorohydrin/dimethylamine polymer, homopolymers of cationic diallyl-N,N-disubstituted ammonium monomers, homopolymers of N,N-disubstituted-aminoethyl(meth)acrylate monomers and their quaternary salts, homopolymers of N-N-disubstituted-aminopropyl(meth)acrylamide and their quaternary salts, copolymers of diallyl-N,N-disubstituted ammonium monomers and N,N-disubstituted-aminoethyl(meth)acrylate monomers and their quaternary salts, copolymers of diallyl-N,N-disubstituted ammonium monomers and N,N-disubstituted-aminopropyl(meth)acrylamide monomers and their quaternary salts and cationic polymers comprising at least 20 mole percent of one or more cationic diallyl-N,N-disubstituted ammonium monomers, N,N-disubstituted-aminoethyl(meth)acrylate monomers and their quaternary salts or N,N-disubstituted-aminopropyl (meth)acrylamide monomers and their quaternary salts and one or more nonionic monomers, preferably (meth)acrylamide, N-substituted or N,N-disubstituted (meth) acrylamide or styrene, and mixtures thereof. The molecular weight of the stabilizer is preferably in the range of about 10,000 to 10,000,000 g/mol.

Stabilizers used for preparing anionic and nonionic dispersion polymers include anionically charged water soluble polymers having a molecular weight of from about 10,000 to about 10,000,000 and preferably from about 1,000,000 to about 3,000,000. The stabilizer polymer must be soluble or slightly soluble in the salt solution, and must be soluble in water.

Representative anionic stabilizers include but are not limited to polyacrylic acid, poly(meth)acrylic acid, poly(2-acrylamido-2-methyl-1-propanesulfonic acid), copolymers of 2-acrylamido-2-methyl-1-propanesulfonic acid and an anionic comonomer selected from acrylic acid and methacrylic acid, polymers of one or more anionic monomers and one or more nonionic monomers, and the sodium salts of the aforementioned anionic stablizers.

Nonionic dispersants can also be used alone or in combination with the cationic, anionic and nonionic stabilizers described herein for preparing cationic, anionic and nonionic dispersion polymers. Representative nonionic dispersants include, but are not limited to polyvinyl alcohol, polyvinyl pyrrolidinone, polyethylene glycol, polypropylene glycol, polyethylene oxide, polyethylene, soluble starch, poly(N-vinylpyridine), and the like.

A multifunctional alcohol such as glycerin or ethylene glycol may also be included in the polymerization system. The deposition of the fine particles is smoothly carried out in the presence of these alcohols.

The polymerization reaction is initiated by any means that results in generation of a suitable free radical. Initiation may be induced through the use of any number of conventional systems including thermal, photochemical, or redox coupled initiation systems. Thermally derived radicals, in which the radical species results from thermal, homolytic dissociation of a water-soluble azo, peroxide, hydroperoxide and perester compound are preferred. Especially preferred initiators are azo compounds including 2,2'-azobis(2-amidinopropane) dihydrochloride and 2,2'-azobis(N,N'-dimethyleneisobutylamine) hydrochloride, and the like.

A seed polymer may be added to the reaction mixture before the initiating polymerization of the monomers for the purpose of facilitating a fine dispersion of particles. The seed polymer is a water-soluble polymer insoluble in the aqueous solution of the polyvalent anionic salt. The monomer composition of the seed polymer need not be identical to that of the water-soluble polymer formed during polymerization. The seed polymer is preferably a polymer prepared by the dispersion polymer process described herein.

Since the dispersion polymers do not contain surfactants or oil, the dispersion polymers are environmentally friendly. Moreover, the absence of oil in the dispersion polymers equates to such polymers having virtually zero volatile organic content (VOC), and dramatically reduced biological oxygen demand (BOD), carbon oxygen demand (COD) and total organic carbon (COD) compared to conventional inverse emulsion polymers. This is another environmental advantage of such polymers.

"(Meth)acrylic acid" means acrylic acid or methacrylic acid or a salt thereof.

"(Meth)acrylamide" means acrylamide or methacrylamide.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer as defined herein which is electrically neutral. Representative non-ionic, water-soluble monomers include acrylamide, methacrylamide, N-methylacrylamide, N,N-dimethylacrylamide, N,N-diethylacrylamide, N-isopropylacrylamide, N-vinylformamide, N-vinylmethylacetamide, dimethylhydroxypropyl (meth) acrylate, hydroxyethyl methacrylate, hydroxyethyl acrylate, hydroxypropyl acrylate, hydroxypropyl methacrylate, N-t-butylacrylamide, N-methylolacrylamide, vinyl acetate, acrylonitrile, 2-ethylhexyl acrylate, and the like.

"RSV" stands for Reduced Specific Viscosity. Within a series of polymer homologs which are substantially linear and well solvated, "reduced specific viscosity (RSV)" measurements for dilute polymer solutions are an indication of polymer chain length and average molecular weight according to Paul J. Flory, in "*Principles of Polymer Chemistry*", Cornell University Press, Ithaca, N.Y., © 1953, Chapter VII, "*Determination of Molecular Weights*", pp. 266–316. The RSV is measured at a given polymer concentration and temperature and calculated as follows:

$$RSV = \frac{[(\eta/\eta_o) - 1]}{c}$$

$\eta$=viscosity of polymer solution
$\eta_o$=viscosity of solvent at the same temperature
c=concentration of polymer in solution.

The units of concentration "c" are (grams/100 ml or g/deciliter). Therefore, the units of RSV are dl/g. In this patent application, a 1.0 or 0.125 molar sodium nitrate solution is used for measuring RSV. The polymer concentration in this solvent is measured at about 0.045 g/dL. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/gram. When two polymer homologs within a series have similar RSV's that is an indication that they have similar molecular weights.

Preferred Embodiments

The dispersion described herein are added to an aqueous fracturing fluid to reduce the friction resulting from turbulent flow in the aqueous fracturing fluid in an oil field fracturing process where the fracturing fluid is pumped at high velocity into a subterranean formation. Typical velocities for fracturing fluids, which generally are pumped through a 2–4 inch pipe, range from about 5 to about 80 or more feet per second and most commonly are about 10 feet per second.

Typical dispersion polymers of this invention have RSV's of from about 10 to about 50 and contain from about 10 to about 30 percent polymer actives.

The polymers of this invention have a molecular weight of at least about 100,000, where the upper limit of the molecular weight is limited only by the solubility of the polymer in fracturing fluid. Preferred polymers have a molecular weight of at least one million and more preferred polymers have a molecular weight of at least five million.

The aqueous fracturing fluids of this invention include fresh water, brines containing polyvalent cations, including sodium chloride, potassium chloride, ammonium chloride and calcium chloride, and acidic fracturing fluids.

Various additives may be added to the fracturing fluid to change the physical properties of the fluid or to serve a certain beneficial function. Generally a propping agent such as sand or other hard material is added which serves to keep the fractures open after the fracturing operation. Also, fluid loss agents may be added to partially seal off the more porous sections of the formation so that the fracturing occurs in the less porous strata. Viscosifying agents may also be added so that the propping agent may be dispersed within the fluid during injection and more easily carried.

Other oilfield additives that may also be added to the fracturing fluid include emulsion breakers, antifoams, scale inhibitors, $H_2S$ and $O_2$ scavengers, biocides, surface tension reducers, shale and clay stabilizers, paraffin/asphaltene inhibitors and corrosion inhibitors.

Preferred corrosion inhibitors include quaternary ammonium salts, alkyl-substituted heterocycles, amides and imidazolines as disclosed in U.S. Pat. No. 5,939,362, incorporated herein by reference.

The composition of the fracturing fluid may be adjusted depending on the particular well or formation to be fractured. For example, in fracturing certain formations it may be desirable to use a high concentration of the propping agent, while in other formations, little or no propping agent may be used.

In general, the polymer is added to the fracturing fluid continuously in an amount of from about 25 to about 2500 ppm, preferably from about from 50 to 1000 ppm and more preferably from about 100 to about 300 ppm based on the aqueous fracturing fluid.

The dispersion polymer is preferably applied on site by a blender metering product into the fracturing fluid. The dispersion polymer may be added by simply pouring from the container into the fluid stream or very accurately by using a positive displacement pump tied to a feedback from the flowmeter on the blender.

In a preferred aspect of this invention, the dispersion polymer is composed of from about 95 to about 50 mole percent of one or more nonionic monomers and from about 95 to about 50 mole percent of one or more cationic monomers selected from the group consisting of dialkylaminoalkyl acrylates and methacrylates and their quaternary or acid salts.

In another preferred aspect, the cationic monomers are selected from dimethylaminoethyl acrylate methyl chloride quaternary salt and dimethylaminoethyl acrylate benzyl chloride quaternary salt.

In another preferred aspect, the dispersion polymer is acrylamide/dimethylaminoethyl acrylate methyl chloride quaternary salt/dimethylaminoethyl acrylate benzyl chloride quaternary salt terpolymer.

In another preferred aspect, the dispersion polymer is acrylamide/dimethylaminoethyl acrylate methyl chloride quaternary salt copolymer.

In another preferred aspect, the dispersion polymer is composed of from about 95 to about 50 mole percent of one or more nonionic monomers and from about 95 to about 50 mole percent of one or more anionic monomers selected from the group consisting of acrylic acid, methacrylic acid and 2-acrylamido-2-methylpropanesulfonic acid and the salts thereof.

In another preferred aspect, the dispersion polymer is acrylamide/acrylic acid sodium salt copolymer.

In another preferred aspect, the dispersion polymer is acrylamide/acrylic acid copolymer.

In another preferred aspect, the dispersion polymer is acrylamide/acrylic acid/acrylic acid sodium salt terpolymer.

In another preferred aspect, the dispersion polymer has a molecular weight of at least 1,000,000.

In another preferred aspect, the dispersion polymer has a molecular weight of at least 5,000,000.

In another preferred aspect, the fracturing fluid is selected from the group consisting of fresh water, brines and aqueous acids.

In another preferred aspect, one or more corrosion inhibitors are added to the fracturing fluid.

In another preferred aspect, the corrosion inhibitor is selected from the group consisting of quaternary ammonium salts, alkyl-substituted heterocycles, amides and imidazolines.

The foregoing may be better understood by reference to the following examples, which are presented for purposes of illustration and are not intended to limit the scope of this invention.

EXAMPLE 1

The polymer is tested in a recirculating flow loop consisting of a 50 gallon tank, overhead stirrer for the tank, recirculating pump and 0.43 inch i.d. stainless steel loop. With the pump and stirrer running, a measured amount of dispersion polymer is added to the tank at the concentrations shown in Table 1.

Three base fluid systems are used: tap water at 90° F., tap water at 40° F. and 15% aqueous HCl solution at 80° F. The pressure difference (DP) of these fluids across 57 feet of tubing at flow rates of 2.5, 4, 6, 8 and 10 gallons/min are recorded as the baseline. The effectiveness of a friction reducer is represented by a percentage (%FR) based on the amount of pressure drop (DP) that the polymer solution produces vs. the pressure drop of the corresponding base fluid.

The polymer, dosage, fluid and temperature tested are summarized in Table 1. The efficiency of the polymer is listed in Tables 2, 3 and 4.

In Tables 1–4, Polymer A is a 20 percent polymer actives acrylamide/dimethylaminoethyl acrylate benzyl chloride quaternary salt/dimethylaminoethyl acrylate methyl chloride quaternary salt terpolymer (65/15/20 mole ratio) dispersion, RSV=25 to 35 dL/g; Polymer B is a 20 percent polymer actives acrylamide/dimethylaminoethyl acrylate benzyl chloride quaternary salt/dimethylaminoethyl acrylate methyl chloride quaternary salt terpolymer (65/25/10 mole ratio) dispersion, RSV=15 to 25 dL/g; Polymer C is a 15 percent polymer actives acrylamide/dimethylaminoethyl acrylate methyl chloride quaternary salt copolymer (90/10 mole ratio) dispersion, RSV=13.5 to 21.0 dL/g; and Polymer D is a 25 percent polymer actives acrylamide/acrylic acid/sodium acrylate terpolymer (70/25/5 mole ratio) dispersion, RSV=24.0 to 32.0 dL/g. Polymers A–D are available from Ondeo Nalco Company, Naperville, Ill.

TABLE 1

Representative Polymers and Base Fluids Tested for Friction Reduction

| Exp # | Base fluid | Polymer | Conc (%; v/v) |
|---|---|---|---|
| 1 | 15% HCl @80° F. | None | |
| 2 | 15% HCl @80° F. | A | 0.15 |
| 3 | 15% HCl @80° F. | C | 0.095 |
| 4 | 15% HCl @80° F. | A | 0.075 |
| 17 | 15% HCl @80° F. | B | 0.075 |
| 5 | 90° F. $H_2O$ | None | |
| 6 | 90° F. $H_2O$ | A | 0.15 |
| 7 | 90° F. $H_2O$ | D | 0.023 |
| 8 | 90° F. $H_2O$ | C | 0.19 |
| 9 | 90° F. $H_2O$ | B | 0.14 |
| 10 | 40° F. $H_2O$ | None | |
| 13 | 40° F. $H_2O$ | B | 0.112 |
| 14 | 40° F. $H_2O$ | A | 0.1127 |
| 15 | 40° F. $H_2O$ | C | 0.14 |

TABLE 2

Performance of Dispersion polymers as Friction Reducers in 15% Hydrochloric Acid

| Rate (gpm) | 1 (Blank) DP (psi) | 2 (Polymer A) DP (psi) | 2 (Polymer A) % FR | 3 (Polyme C) DP (psi) | 3 (Polyme C) % FR | 4 (Polymer A) DP (psi) | 4 (Polymer A) % FR | 17 (Polymer B) DP (psi) | 17 (Polymer B) % FR |
|---|---|---|---|---|---|---|---|---|---|
| 2.5 | 9.2 | 2.7 | 70.4 | 4.3 | 53.4 | 3.7 | 59.9 | 3.8 | 58.7 |
| 4.0 | 20.8 | 6.7 | 67.6 | 8.0 | 61.6 | 7.4 | 64.6 | 7.8 | 62.5 |
| 6.0 | 42.7 | 12.0 | 71.9 | 13.5 | 68.4 | 13.4 | 68.5 | 13.6 | 68.2 |
| 8.0 | 70.2 | 18.8 | 73.3 | 20.2 | 71.3 | 20.7 | 70.5 | 20.5 | 70.8 |
| 10.0 | 105.6 | 25.7 | 75.7 | 27.9 | 73.6 | 30.0 | 71.6 | 28.7 | 72.8 |

As shown in Table 2, cationic polymers having differing degrees of cationic charge and monomer composition show efficacy as friction reducer in a 15% hydrochloric acid solution. The data also indicate that at a higher flow velocity, where turbulence is more pronounced, the benefit of having a polymer in the fluid is higher.

TABLE 3

Performance of Dispersion polymers as Friction Reducers in 90° F. Tap Water

| Rate (gpm) | 5 (Blank) DP (psi) | 6 (Polymer A) DP (psi) | 6 (Polymer A) % FR | 7 (Polymer D) DP (psi) | 7 (Polymer D) % FR | 8 (Polymer C) DP (psi) | 8 (Polymer C) % FR | 9 (Polymer B) DP (psi) | 9 (Polymer B) % FR |
|---|---|---|---|---|---|---|---|---|---|
| 2.5 | 7.9 | 1.8 | 77.3 | 6.2 | 22.1 | 3.3 | 58.1 | 3.5 | 56.3 |
| 4.0 | 18.0 | 4.8 | 73.4 | 14.2 | 21.3 | 6.6 | 63.1 | 6.7 | 62.7 |
| 6.0 | 38.1 | 9.2 | 75.8 | 35.1 | 7.8 | 12.0 | 68.6 | 11.9 | 68.8 |
| 8.0 | 63.6 | 17.3 | 72.8 | 59.7 | 6.2 | 18.6 | 70.7 | 18.0 | 71.6 |
| 10.0 | 92.2 | 24.2 | 73.8 | 84.7 | 8.2 | 25.4 | 72.5 | 25.0 | 72.9 |

As shown in Table 3, in relatively warm fresh water which simulates summertime field water conditions, all polymers show efficacy.

TABLE 4

Performance of Dispersion polymers as a Friction Reducer in 40° F. Tap Water

| Rate (gpm) | 10 (Blank) DP (psi) | 13 (Polymer B) DP (psi) | 13 (Polymer B) % FR | 14 (Polymer A) DP (psi) | 14 (Polymer A) % FR | 15 (Polymer C) DP (psi) | 15 (Polymer C) % FR |
|---|---|---|---|---|---|---|---|
| 2.5 | 10.1 | 5.2 | 48.6 | 5.2 | 48.6 | 8.9 | 12.2 |
| 4.0 | 22.7 | 9.2 | 59.4 | 9.0 | 60.4 | 8.7 | 61.5 |
| 6.0 | 45.8 | 15.8 | 65.5 | 15.7 | 65.6 | 15.5 | 66.1 |
| 8.0 | 74.9 | 24.1 | 67.9 | 23.8 | 68.2 | 23.7 | 68.4 |
| 10.0 | 110.2 | 33.1 | 70.0 | 33.4 | 69.7 | 33.8 | 69.4 |

As shown in Table 4, in relatively cold fresh water which simulates wintertime field water conditions, all polymers tested show efficacy.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

We claim:

1. A method of reducing friction resulting from turbulent flow in an aqueous fracturing fluid in an oil field fracturing process comprising adding to the aqueous fracturing fluid an effective friction-reducing amount of one or more dispersion polymers, wherein the dispersion polymer is composed of from about 5 to about 95 mole percent of one or more nonionic monomers and from about 95 to about 5 mole percent of one or more cationic or anionic monomers and has a molecular weight of at least 100,000.

2. The method of claim 1 wherein the dispersion polymer is composed of from about 95 to about 50 mole percent of one or more nonionic monomers and from about 5 to about 50 mole percent of one or more cationic monomers selected from the group consisting of dialkylaminoalkyl acrylates and methacrylates and their quaternary or acid salts.

3. The method of claim 2 wherein the cationic monomers are selected from dimethylaminoethyl acrylate methyl chloride quaternary salt and dimethylaminoethyl acrylate benzyl chloride quaternary salt.

4. The method of claim 3 wherein the dispersion polymer is acrylamide/dimethylaminoethyl acrylate methyl chloride quaternary salt/dimethylaminoethyl acrylate benzyl chloride quaternary salt terpolymer.

5. The method of claim 3 wherein the dispersion polymer is acrylamide/dimethylaminoethyl acrylate methyl chloride quaternary salt copolymer.

6. The method of claim 1 wherein the dispersion polymer is composed of from about 95 to about 50 mole percent of one or more nonionic monomers and from about 5 to about 50 mole percent of one or more anionic monomers selected from the group consisting of acrylic acid, methacrylic acid and 2-acrylamido-2-methylpropanesulfonic acid and the salts thereof.

7. The method of claim 6 wherein the dispersion polymer is acrylamide/acrylic acid sodium salt copolymer.

8. The method of claim 6 wherein the dispersion polymer is acrylamide/acrylic acid.

9. The method of claim 6 wherein the dispersion polymer is acrylamide/acrylic acid/acrylic acid sodium salt terpolymer.

10. The method of claim 1 wherein the dispersion polymer has a molecular weight of at least 1,000,000.

11. The method of claim 1 wherein the dispersion polymer has a molecular weight of at least 5,000,000.

12. The method of claim 1 wherein the fracturing fluid is selected from the group consisting of fresh water, brines and aqueous acids.

13. The method of claim 1 further comprising adding one or more corrosion inhibitors to the fracturing fluid.

14. The method of claim 11 wherein the corrosion inhibitor is selected from the group consisting of quaternary ammonium salts, alky-substituted heterocycles, amides and imidazolines.

* * * * *